United States Patent Office 3,191,553
Patented June 29, 1965

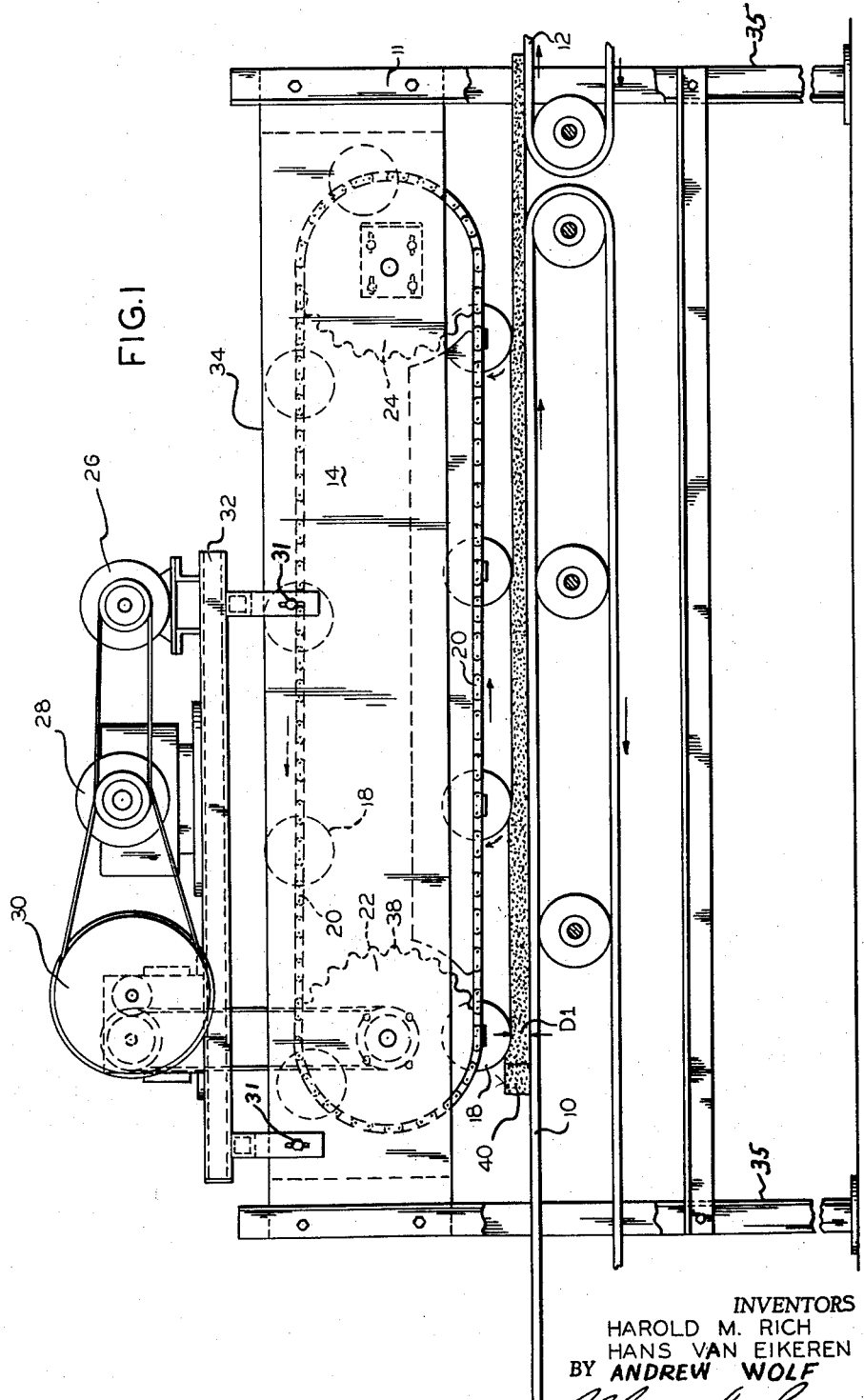

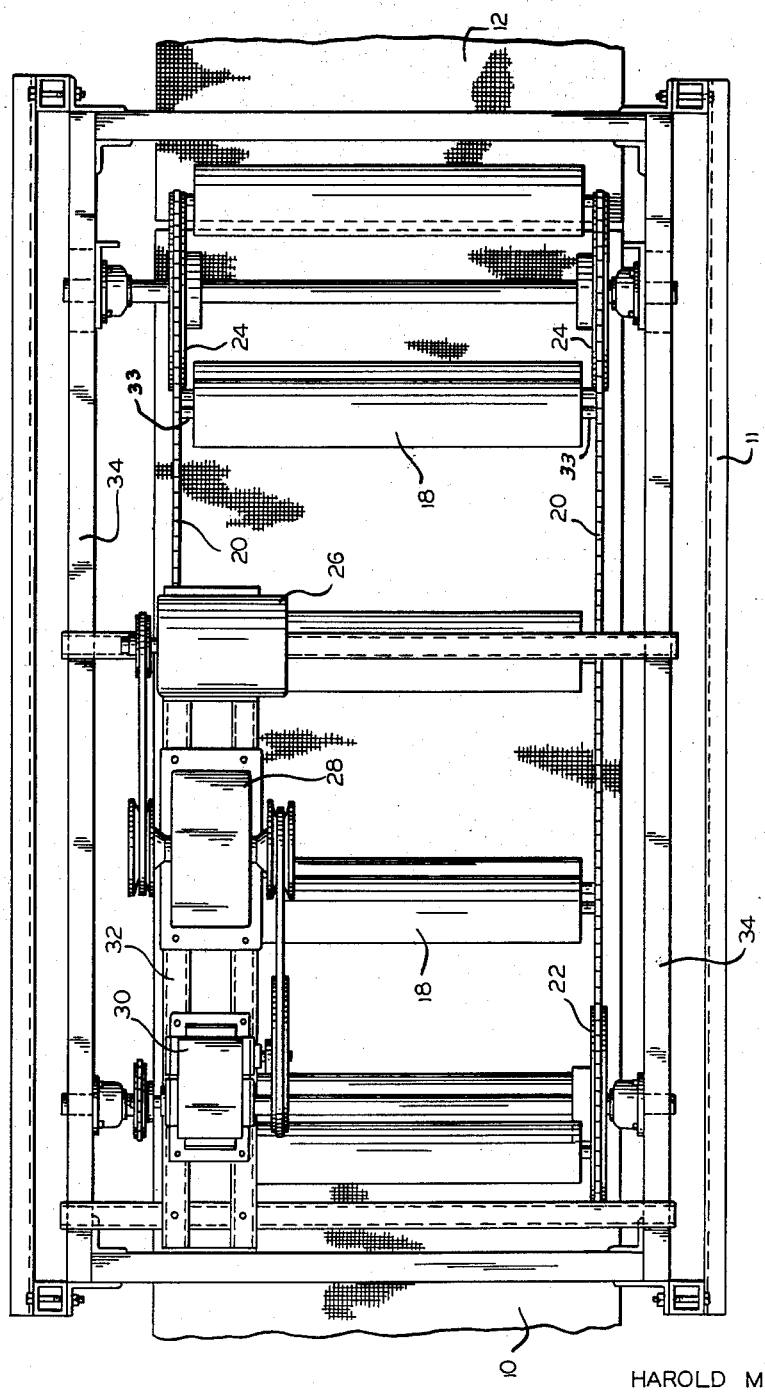

3,191,553
DOUGH ROLLING APPARATUS
Harold M. Rich, Chicago, Hans Van Eikeren, Lincolnwood, and Andrew Wolf, Wilmette, Ill., assignors to Kitchens of Sara Lee, Inc., Chicago, Ill., a corporation of Maryland
Filed July 23, 1962, Ser. No. 211,637
6 Claims. (Cl. 107—12)

This invention relates in general to dough sheeter apparatus and more specifically to apparatus for sequentially rolling dough into sheets of predetermined thickness.

It is always desirable when handling dough that is used for baking cakes and bread, and the like, to handle the dough with as much gentleness as possible, so as not to rupture the dough structure. This problem is even more significant when Danish type dough is used, in that in the Danish type dough, a layer of butter is inserted between adjacent layers of dough, and the layers of butter rupture before the dough itself, and therefore a particularly acute problem exists in the handling of this type of dough.

In the prior art, when a batch of dough was to be rolled into sheets of predetermined thickness, a conveyor belt would carry the dough to fixed rotatable cylindrical rollers positioned at predetermined distances above and/or below the plane of the conveyor belt and the dough would be flattened in one step. This resulted in rupturing of the dough itself and where Danish type dough was being flattened the situation was much worse. When Danish type dough is flattened as just described, not only is the dough ruptured, but also the butter layers are cracked and fragmented substantially diminishing the quality of the dough.

It is therefore a general object of this invention to provide apparatus for rolling dough into sheets of predetermined thickness.

It is another object of this invention to provide apparatus for rolling dough into sheets of predetermined thickness wherein the rolling action is accomplished in steps thereby preventing rupturing of the dough.

It is another object of this invention to provide apparatus for rolling dough into sheets of predetermined thickness that is easy and comparatively inexpensive to manufacture and which is efficient in operation.

Briefly, in a preferred embodiment of the invention, a block of dough for example, and it is not necessary that the dough be in block form, is carried along a first conveyor belt into engagement with a plurality of freely rotatable and linearly moving cylindrical rollers. The plurality of rollers are positioned over the first conveyor belt and are connected to one another in an endless belt arrangement. The plurality of rollers travel in a downwardly inclined direction with respect to the first conveyor belt and travel at a greater speed than the first conveyor belt so as to gently flatten the block of dough. As the block of dough is being rolled into sheets of predetermined thickness, the dough spreads out to the sides as well as forward or down the first conveyor belt as can be readily imagined. Therefore the part of the dough that is caused to spread forwardly will be moving relative to the first conveyor belt. There is thus the danger that as the flattened dough spreads wrinkles will form therein because of the friction between the flattened dough and the first conveyor belt. As long as the flattened dough is being acted upon by the rotatable rollers any wrinkles that occur will subsequently be flattened out. In order, however, to avoid wrinkling of the dough after it passes beyond the action of the rollers a second conveyor belt is positioned in line with and contiguous with the first conveyor belt. The second conveyor belt is driven at a faster speed than the first conveyor belt and at the speed of the flattened dough so that there will be no relative movement between the flattened dough and the second conveyor belt thereby avoiding the possibility of wrinkling of the dough as it is being rolled to the desired thickness. This arrangement of conveyor belts and rollers gently flattens and spreads the dough in a manner which is particularly desirable or when the dough block consists of interspaced layers of dough and butter such as might be encountered when working on Danish type pastry.

Other objects, advantages, and features of the invention will become more apparent if the following is viewed in light of the accompanying drawings, of which:

FIG. 1 is a front elevational view of a preferred embodiment of the invention; and FIG. 2 is a top plan view of the embodiment of the invention illustrated in FIG. 1.

Referring to the drawings, there is illustrated a first conveyor belt 10, a second conveyor belt 12, and a rolling mechanism generally designated 14. The rolling mechanism 14 is mounted on a frame structure 11 that need not be of any particular configuration and which can be readily provided by one skilled in the art. The first conveyor belt 10 and the second conveyor belt 12 are positioned in a line and are functionally contiguous with one another, thereby providing in effect a single continuous conveyor path. The rolling mechanism 14 is positioned over conveyor belt 10 in a predetermined manner as will be explained.

The first conveyor belt 10 can be of any conventional type, and drive means can be provided by one skilled in the art, to drive the first conveyor belt at a predetermined speed. Similarly, the second conveyor belt 12 can be of any known type and drive means can be provided by one skilled in the art to drive the second conveyor belt 12. The second conveyor belt 12 is driven at a faster speed than the first conveyor belt 10. As the dough is being flattened and spread, the portion of the dough that is being flattened and spread travels faster than the remainder of the dough block and the first conveyor belt 10. In order to prevent any wrinkling of the dough, the faster moving second conveyor belt 12 is provided.

The rolling mechanism 14 positioned over the conveyor belt 10 comprises a plurality of spaced cylindrical rollers 18 freely rotatable on their own axes and connected together by a chain structure 20 interlinking these plurality of rollers 18 in an endless belt type arrangement. The rollers 18 are driven in their somewhat elliptical path by a pair of drive sprockets 22 and a pair of idler sprockets 24 that are secured to the frame 11 by any known means. The drive sprocket 22 in the illustrated embodiment of the invention is driven by an electric motor 26 through a speed changer mechanism 28 which may be of any well known construction and through a suitable speed reducer mechanism 30.

The drive means for the rolling mechanism 14 just described including the motor 26, the speed changer 28, and the speed reducer 30 is only one of many types of drive means which can be provided and in no way limits the invention inasmuch as the drive means does not form a significant part of the invention. The illustrated drive means is positioned on a platform 32 that is adjustably bolted by bolts 31 to the frame sides 34 of the frame structure 11.

The drive sprockets 22 and the idler sprockets 24 are provided with a plurality of teeth 38 extending around the periphery thereof. The teeth 38 engage the chain structure 20 and drive the rollers 18 in a somewhat elliptical path as clearly illustrated in the drawings. The rollers 18, as previously stated, are freely rotatable about their own axes and are formed in a hollow cylindrical configuration although not limited thereto. The rollers 18 can be formed in a multitude of ways as for example by positioning an axial shaft in a hollow cylinder and securing the cylinder to the shaft by spokes or by closing the ends of the cylinder and securing the two ends to the shaft. The shaft itself could then rotate in bearings as for example bearings 33 which in turn are secured to the chains 20.

The rolling mechanism 14 and the first conveyor belt 10 are relatively positioned so that the rolling means apparatus 14 is inclined downwardly from left to right as viewed in the drawings with respect to the first conveyor belt. The plurality of rollers 18 as they travel in their somewhat elliptical paths around the drive sprockets 22 and the idler sprockets 24, and while proceeding from left to right, as illustrated in FIG. 1, come closer and closer to the top surface of the first conveyor belt. Means (not shown) can be provided to adjust the height and angle of the rolling means mechanism 14 with respect to the first conveyor belt and such means can be relatively simple. For example, the legs 35 of the frame 11 can be made individually adjustable in height. By adjustment of the height of the legs 35 the rolling mechanism 14 can then be raised or lowered over the first conveyor belt 10 and also can be inclined at selected angles to the first conveyor belt 10. Thus, for example, by raising the legs 35 on the left hand side as viewed in the drawings to a height greater than the legs 35 on the right hand side as viewed in the drawings it is possible to position the rolling mechanism 14 at various predetermined angles with respect to the first conveyor belt 10.

*Operation*

Initially, a block of dough 40, for example, is positioned on the first conveyor belt 10 and the first conveyor belt 10 is driven to transport the block of dough 40 underneath the rolling mechanism 14. The block of dough 40 is of a greater thickness than the distance D1 which is the distance between the bottom of the first roller 18 and the first conveyor belt 10. If, for example, the block of dough 40 engaged the first roller 18, as shown in FIG. 1, it would then be flattened to a thickness of D1 by the first roller 18. The rollers 18 which are moving at a faster speed than the first conveyor belt 10 will therefore roll along on top of the block of dough 40 and gently flatten the dough because the path of the rollers 18 is downwardly inclined with respect to the first conveyor belt 10. The rollers 18 will thus always apply a compressive force to the dough 40 and will be continually spreading the dough 40 as they roll over the dough 40. The movement and the spreading forward of the block of dough 40 when viewed by an observer is extremely gentle. As soon as the block of dough 40 enters beneath the first roller 18, that portion of the block of dough 40 that has been compressed by the first roller 18 will be moving forward at a greater speed than the remainder of the block of dough 40. However, since the rollers 18 travel at a greater linear rate of speed than the block of dough 40, they will push the block of dough forward along the conveyor belt 10 so as to smooth out any wrinkles that may occur in the spreading dough.

However, as soon as the dough emerges from beneath the last roller 18, it must either push itself forward or wrinkles and bumps in the dough will be formed. If the conveyor belt 10 was frictionless then the block of dough 40 could probably push itself forward to compensate for the flattening and spreading out of the dough block 40. However, the friction of the conveyor belt 10 itself will retard the movement of the block of dough 40 and consequently will cause the dough to form wrinkles and other undesirable undulations. Therefore, the second conveyor belt 12 has been provided adjacent the position of the last roller 18. As the dough emerges from underneath the last roller 18, it makes contact with and is carried away by the faster moving conveyor belt 12. The conveyor belt 12 is adjusted so as to travel at the same speed as the dough emerging from beneath the last roller 18 so that there will be no relative movement between the moving dough and the conveyor belt 12 thus eliminating the cause of wrinkling and the like.

It will of course be appreciated that the conveyor belts 10 and 12 desirably should be positioned as close together as possible in order to afford a substantially continuous and uninterrupted conveyor path. In actual practice, the beginning of the second conveyor belt 12 is positioned in such close proximity to the final or leading roller 18, that the momentum of the dough emerging from under said roller is sufficient to propel the dough onto the belt 12. Thus, any possible sag of the emerging sheet of dough into the small gap between the top horizontal surfaces of the two belts is prevented. If desired, however, a suitable planar plate or the like may be positioned between the two belts and in vertical alignment with the top surfaces thereof to eliminate the described gap between said belts.

The proper speeds of the conveyor belt 10 and the conveyor belt 12 as well as that of rolling mechanism 14 can be determined empirically.

It is clear that many modifications and alterations can be made in the disclosed structure without departing from the inventive scope of the invention and the appended claims are intended to be limited only by the prior art.

What is claimed is:

1. In apparatus for rolling dough into sheets of predetermined thickness: first means for moving dough in a first predetermined path; second means positioned adjacent said first means for moving dough in an extension of said first predetermined path; and rolling means positioned above said first means for engaging and rolling dough positioned on said first means into sheets of predetermined thickness; said rolling means comprising a series of individual freely rotatable rollers adapted to travel over said first predetermined path, spaced a predetermined distance from one another, and adapted to travel at a linear speed different from the speed of said first means; said second means adapted to receive dough positioned on said first means after said dough moves past said rolling means and said second means adapted to travel at a linear speed greater than the speed of said first means.

2. In apparatus for rolling dough into sheets of predetermined thickness: first conveyor means for moving dough in a first predetermined path; second conveyor means positioned adjacent said first conveyor means for moving dough positioned on said first conveyor means in an extension of said first predetermined path; and rolling means positioned above said first means for engaging and rolling dough positioned on said first conveyor means into predetermined thickness; said rolling means comprising a series of individual freely rotatable rollers adapted to move linearly over said first predetermined path, spaced a predetermined distance from one another, and adapted to travel at a linear speed different from the speed of said first conveyor means; said second conveyor means adapted to receive dough positioned on said first conveyor means after said dough moves past said rolling means and said second conveyor means adapted to travel at a speed greater than the speed of said first conveyor means.

3. In apparatus for rolling dough into sheets of predetermined thickness: first means for moving dough in a first predetermined path; second means positioned adjacent said first means for moving dough positioned on said first means in an extension of said first predetermined path; and rolling means positioned above said first means for engaging and rolling dough positioned on said first means into sheets of predetermined thickness; said rolling means comprising a plurality of freely rotatable rollers connected to one another by an endless chain and adapted to travel linearly at a speed greater than the speed of said first means; said second means adapted to receive dough positioned on said first means after said dough moves past said rolling means and said second means adapted to travel at a speed greater than the speed of said first means.

4. In apparatus for rolling dough into sheets of predetermined thickness: first conveyor means for moving dough in a first predetermined path; second conveyor means positioned adjacent said first conveyor means for moving dough in an extension of said first predetermined path; and rolling means positioned above said first conveyor means for engaging and rolling dough positioned on said first conveyor means into sheets of predetermined thickness; said rolling means comprising, a chain and sprocket drive, and a plurality of freely rotatable cylinders spaced on said chain, said chain adapted to move linearly at a speed greater than the speed of said first conveyor means and the path of said rollers converging toward the path of said first conveyor means; said second conveyor means adapted to receive dough positioned on said first conveyor means after said dough moves past said rolling means and said second conveyor means adapted to travel at a speed greater than the speed of said first conveyor means.

5. Automatic dough rolling apparatus comprising an elongated substantially planar conveyor, an endless chain positioned above said conveyor and adapted to rotate about an axis normal to the longitudinal axis of said conveyor, a plurality of cylindrical rollers rotatably mounted on said chain in spaced relationship with each other and with their longitudinal axes normal to the longitudinal axis of said conveyor, the distance between said rollers and said conveyor diminishing from upstream to downstream, and means for moving said chain at a linear speed greater than the speed of said conveyor whereby said rollers are adapted to roll dough positioned on said conveyor into a sheet of predetermined thickness without rupturing the same.

6. The apparatus of claim 5 in which a second conveyor is positioned adjacent the downstream end of said first conveyor, said second conveyor adapted to receive thereon a sheet of dough positioned on said first conveyor, said second conveyor adapted to move at a linear speed greater than the speed of the first conveyor.

References Cited by the Examiner

UNITED STATES PATENTS

| | | | |
|---|---|---|---|
| 1,134,970 | 4/15 | Lawrence | 107—12 |
| 2,069,496 | 2/37 | Kessler | 80—19 X |
| 2,684,000 | 7/54 | Holtz | 80—38 |
| 2,978,933 | 5/61 | Szendimir | 80—38 |

ROBERT E. PULFREY, *Primary Examiner.*

J. D. BEIN, *Examiner.*